(12) United States Patent
Meinhardt

(10) Patent No.: US 12,103,619 B2
(45) Date of Patent: Oct. 1, 2024

(54) ELECTRIC VEHICLE WITH MOVABLE OPERATOR'S CHAIR

(71) Applicant: Donald Bernard Meinhardt, Cokato, MN (US)

(72) Inventor: Donald Bernard Meinhardt, Cokato, MN (US)

( * ) Notice: Subject to any disclaimer, the term of this patent is extended or adjusted under 35 U.S.C. 154(b) by 295 days.

(21) Appl. No.: 17/503,279

(22) Filed: Oct. 16, 2021

(65) Prior Publication Data

US 2023/0118262 A1    Apr. 20, 2023

(51) Int. Cl.

| B60K 16/00 | (2020.01) |
|---|---|
| B60B 33/00 | (2006.01) |
| B60H 1/00 | (2006.01) |
| B60L 8/00 | (2006.01) |
| B60L 50/60 | (2019.01) |
| B60N 2/04 | (2006.01) |

(Continued)

(52) U.S. Cl.
CPC .............. *B62D 61/08* (2013.01); *B60B 33/00* (2013.01); *B60H 1/00321* (2013.01); *B60K 16/00* (2013.01); *B60L 8/003* (2013.01); *B60L 50/60* (2019.02); *B60N 2/04* (2013.01); *B60Q 1/50* (2013.01); *B60Q 5/00* (2013.01); *B62D 1/12* (2013.01); *B60K 2016/003* (2013.01)

(58) Field of Classification Search
CPC .... B60K 16/00; B60K 2016/003; B60K 1/04; B60K 2001/0416; B60N 2/04; B60N 2/062; B60L 2200/22; B62D 61/08
See application file for complete search history.

(56) References Cited

U.S. PATENT DOCUMENTS

| 5,632,521 A | * | 5/1997 | Archambault | ........... A61G 3/00 |
|---|---|---|---|---|
| | | | | 296/68.1 |
| 5,725,062 A | * | 3/1998 | Fronek | ..................... B60L 8/00 |
| | | | | 180/2.2 |

(Continued)

FOREIGN PATENT DOCUMENTS

| JP | 2001286212 A | * | 10/2001 | ............. A01D 13/00 |
|---|---|---|---|---|
| KR | 20170126384 A | * | 11/2017 | ............. A01B 39/12 |

*Primary Examiner* — Frank B Vanaman
(74) *Attorney, Agent, or Firm* — Vidas, Arrett & Steinkraus PA; Richard A. Arrett; Edwin E. Voigt, II

(57) ABSTRACT

A vehicle provides a frame defining an operator compartment, the operator compartment having a back section and having open sides and an open bottom. A first movable chair is attached to a motorized chair movement device which allows the chair to be moved vertically and horizontally on the back section of the operator compartment within the operator compartment. A pair of rear wheels is connected to the frame, each being driven by an electric motor. The frame has an upper section defining the top of the operator compartment and being constructed and arranged to support a solar panel. The solar panel is electrically connected to at least one battery which is connected to the frame and which provides power to the vehicle. A front caster wheel is rotatable connected to a caster wheel arm which is rotatably connected to the upper frame section. A control computer is connected to the rear wheel motors, motorized chair movement device, caster wheel arm and foot/leg rest. A plurality of operator controls are connected to the first movable chair and operably connected to the control computer for operating the vehicle.

14 Claims, 15 Drawing Sheets

(51) Int. Cl.
*B60Q 1/50* (2006.01)
*B60Q 5/00* (2006.01)
*B62D 1/12* (2006.01)
*B62D 61/08* (2006.01)

(56) References Cited

U.S. PATENT DOCUMENTS

| | | | | |
|---|---|---|---|---|
| 6,717,281 | B1* | 4/2004 | Brandon | B60W 20/00 |
| | | | | 290/40 C |
| 2006/0118162 | A1* | 6/2006 | Saelzer | H02J 3/38 |
| | | | | 136/246 |
| 2007/0294991 | A1* | 12/2007 | Medina | A01D 43/16 |
| | | | | 56/11.9 |
| 2015/0075880 | A1* | 3/2015 | Grossen | A01D 46/243 |
| | | | | 180/2.2 |
| 2015/0151651 | A1* | 6/2015 | Stingle | B60N 2/062 |
| | | | | 296/64 |
| 2018/0264965 | A1* | 9/2018 | Huff | B60L 53/53 |

* cited by examiner

ELECTRIC VEHICLE WITH MOVABLE OPERATOR'S CHAIR

CROSS-REFERENCE TO RELATED APPLICATIONS

Not Applicable

STATEMENT REGARDING FEDERALLY SPONSORED RESEARCH

Not Applicable

FIELD OF THE INVENTION

The vehicle invention is a light weight extremely versatile three wheeled electric battery powered vehicle that allows the operator to place his physique at or near ground level in a sitting position without any obstructions to perform maintenance tasks at ground level or any level above the ground to approximately 80 inches above the ground or floor.

BACKGROUND OF THE INVENTION

Currently there are many tasks which are backbreaking. The task(s) in mind have to do with the unkind motion of bending over and or bending over while walking and the goal of eliminating kneeling and even lying down on your stomach perhaps crawling or lying on your side to do menial work such as tending to plants or turf or removing, installing or repairing anything from ground zero to standing height.

BRIEF SUMMARY OF THE INVENTION

What is needed is a vehicle which allows a person to perform the prior manual backbreaking tasks described above. The inventive vehicle does not have a supporting frame below the operator. All framework that comprises the vehicle's frame is above and about the operator and not below the operator which makes the vehicle unique and extremely safe. The unique characteristics of the vehicle's frame enables the operator to perform tasks at ground level unhindered by framework and greatly assisted by the ability of the operator to move his/her chair type seat to multiple positions down, up and back and forth to perform tasks without compromising comfort such as lying on his/her stomach without head support! In the event of an upset the vehicle is beneath and the operator is on top! Nearly all, if not all other vehicles are on top of you if they upset. The vehicle is very stable due to the fact that the bulk of the weight is over the drive wheels of which includes the batteries, the operator(s), electric motors, most of the frame and the drive wheels.

The inventive vehicle provides all the benefits discussed above with a frame defining an operator compartment, the operator compartment having a back section and having open sides and an open bottom. A first movable chair is attached to a motorized chair movement device which allows the chair to be moved vertically and horizontally on the back section of the operator compartment within the operator compartment. A pair of rear wheels are connected to the frame, each being driven independently by separate electric motors. The frame has an upper section defining the top of the operator compartment and being constructed and arranged to support a solar panel. The solar panel is electrically connected to at least one (as many as eight) batter(ies) which are connected to the frame and which provides power to the vehicle. A front caster wheel is rotatable connected to a caster wheel arm which is motorized and rotatably connected to the upper frame section. A control computer and screen is connected to the forward underside of the ceiling of the operators compartment and is connected to the rear wheel motors, motorized chair movement device, caster wheel arm, rear wheel axle extension and contraction and the foot/leg rest support mechanism and sensor. A plurality of operator controls are connected to the first movable chair and operably connected to the control computer for operating the vehicle.

The vehicle operator controls includes a single joystick for driving the vehicle forward when the joystick is moved forward, rearward when the joystick is moved rearward, turns the vehicle to the right when the joystick is moved right and turns the vehicle to the left when the joystick is moved left. The vehicle can turn in it's own diameter by moving the joystick to the far left or far right which correspondingly turns one rear wheel forward while at the same time the other wheel turns backwards. The vehicle can only be operated at speeds above 5 miles per hour if the caster arm is in the center position and locked in that position as controlled by the computer. Braking is automatic when the joystick is in the stop (neutral) position due to braking mechanisms built into the electric motors.

The vehicle joystick control can be moved to either the extreme far right or extreme far left to trigger either a right U-turn or a left U-turn in which the control computer causes the front castor wheel to track a rear wheel thus making only a two wheel track rather than three, or four tracks.

The vehicle controls includes a button which moves the chair vertically, upwardly or downwardly.

The vehicle controls includes a button which moves the chair horizontally, rightwardly or leftwardly.

The vehicle further includes a ground sensor connected to the bottom of a foot/leg rest connected to the chair, the ground sensor being operatively connected to the control computer to prevent the footrest from engaging the ground. The foot/leg rest is controlled by the computer inasmuch as when the seat is being lowered the foot/leg rest extends forward which enables the operator to have a comfortable foot/leg position when in that position.

The vehicle further includes a GPS guidance system so the vehicle can travel in a forward straight and precision manner. The GPS guidance system is connected to the control computer, and where the joystick can be locked in the front position, so the vehicle can move in a straight direction when moving forward.

The vehicle rear wheels are power movably connected to the frame such that the rear wheels can be selectively moved from a first position, outwardly up to 12 inches each, and can be selectively moved inwardly back to the first position.

The vehicle further includes a tilt sensor connected to the vehicle and to the control computer so to trigger a flashing light and/or an audible buzzer when the vehicle gets within 10 degrees of tipping.

The vehicle control computer can turn the vehicle in its own diameter.

The vehicle further includes a weight sensor connected to the seat and operatively to the control computer to prevent the vehicle from being operated unless a predetermined weight is on the chair. A coded start number has to be entered into the computer before it can be operated for safety reasons instead of a metal key.

The vehicle further includes a cooling or heating fan(s) mounted to the ceiling of the operator compartment.

The vehicle further includes a dump box which can be quick connected to the frame of the vehicle. The dump box can be split so one side serves one side and the box can be on a pivot which allows one half of the box to be turned to be alongside of the operator and within easy reach.

The vehicle further including a remote control for controlling the vehicle without an operator, as a safety feature for example for moving the vehicle onto a ramp for loading and unloading.

The vehicle further including headlights and turn signals and wherein the plurality of operator controls include controls for operating the headlights and turn signals.

An alternate embodiment can be a four wheeled version of the invention.

Another alternate embodiment can reverse frame of the vehicle as well as fenders for all three wheel locations, the two rear wheels and front caster wheel of the three wheel version or four wheel version.

The main advantage of this vehicle is that the operator can perform tasks (tedious and repetitive) that would uncomfortably require you to bend over for prolonged periods of time. As you approach the vehicle you easily sit down on the vehicle's seat as it is turned towards you from a standing position. When you are seated on the seat you fasten your seat belt and press a button and the seat turns to a forward facing position and then by manipulating the controls you can place the seat at ground level or to the left or right side of the vehicle or even 20" above the normal seat height. You can then perform tasks for 8, 10 or 12 hours continually with no more fatigue of doing the same task manually for an hour. For some people it is simply impossible to perform "bending over" type tasks such as the arthritic, handicapped, paraplegic or the aged. Perfectly healthy and physically able people would also enjoy the luxury of the efficient and comfortable means the vehicle provides to them to take the tedium out of heretofore difficult back breaking tasks.

DETAILED DESCRIPTION OF THE INVENTION

Figure 1:
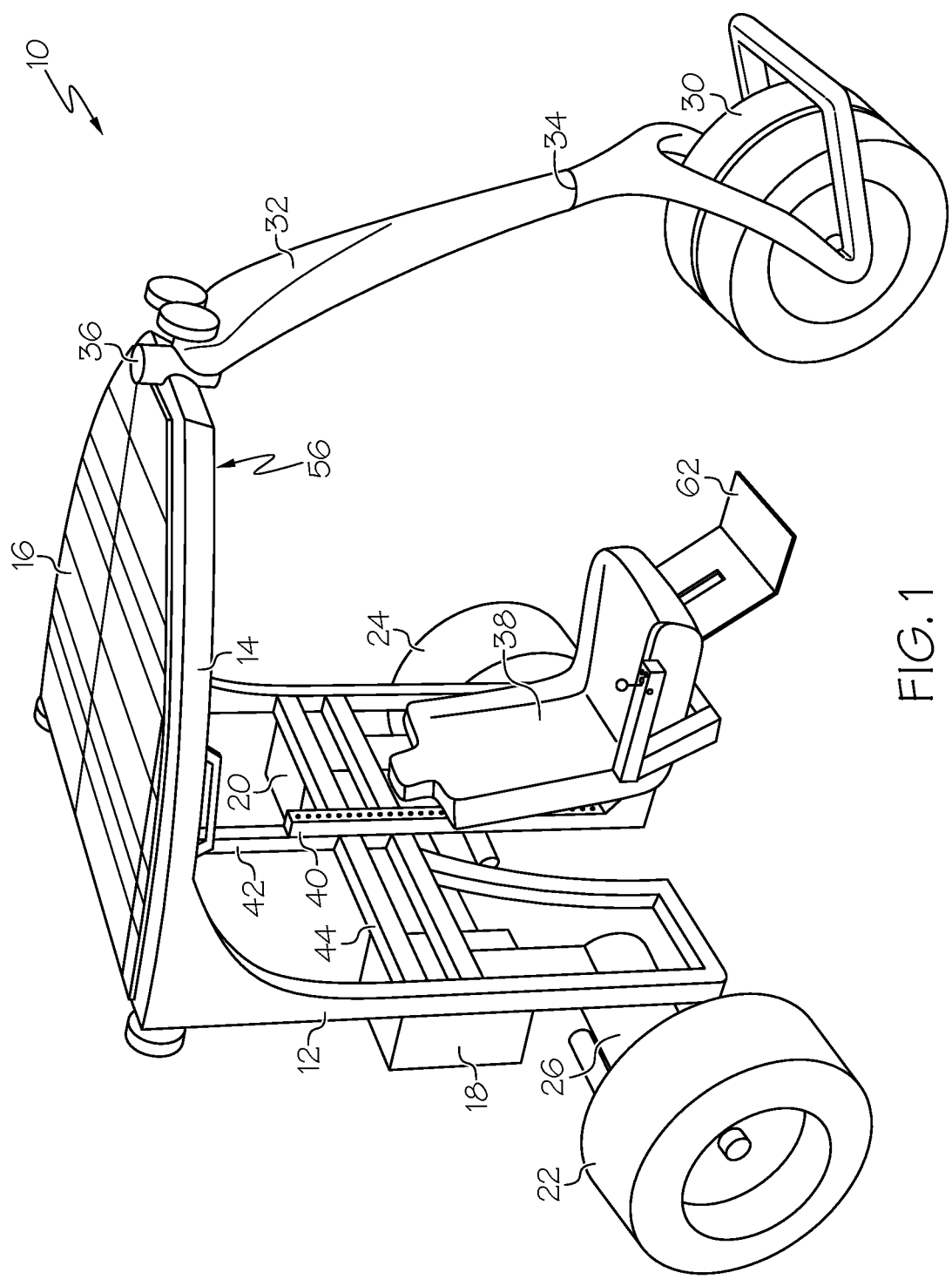
FIG. 1 is a right, front and top view of the vehicle.
Figure 2:
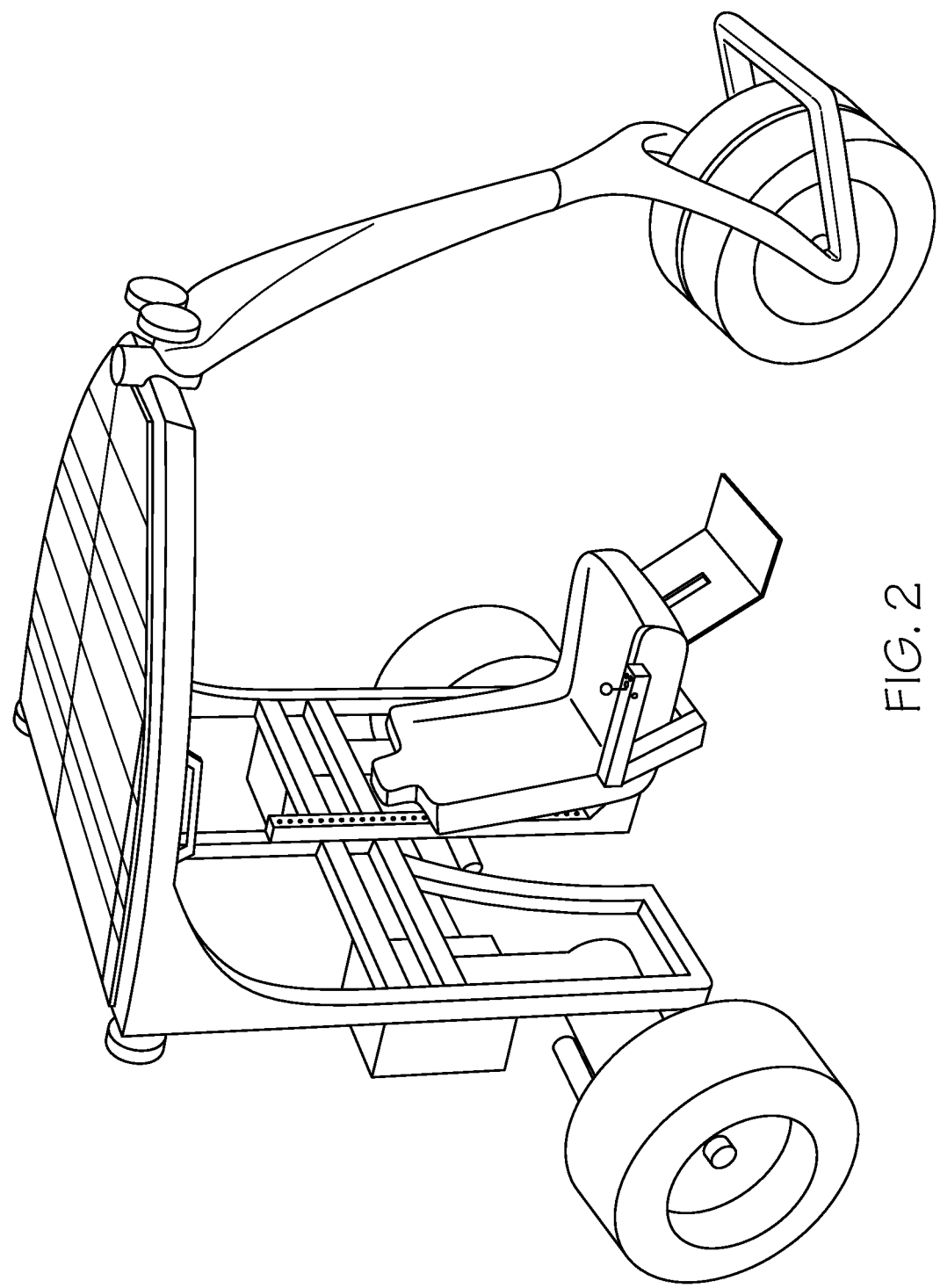
FIG. 2 is a different right, front and top view.
Figure 3:
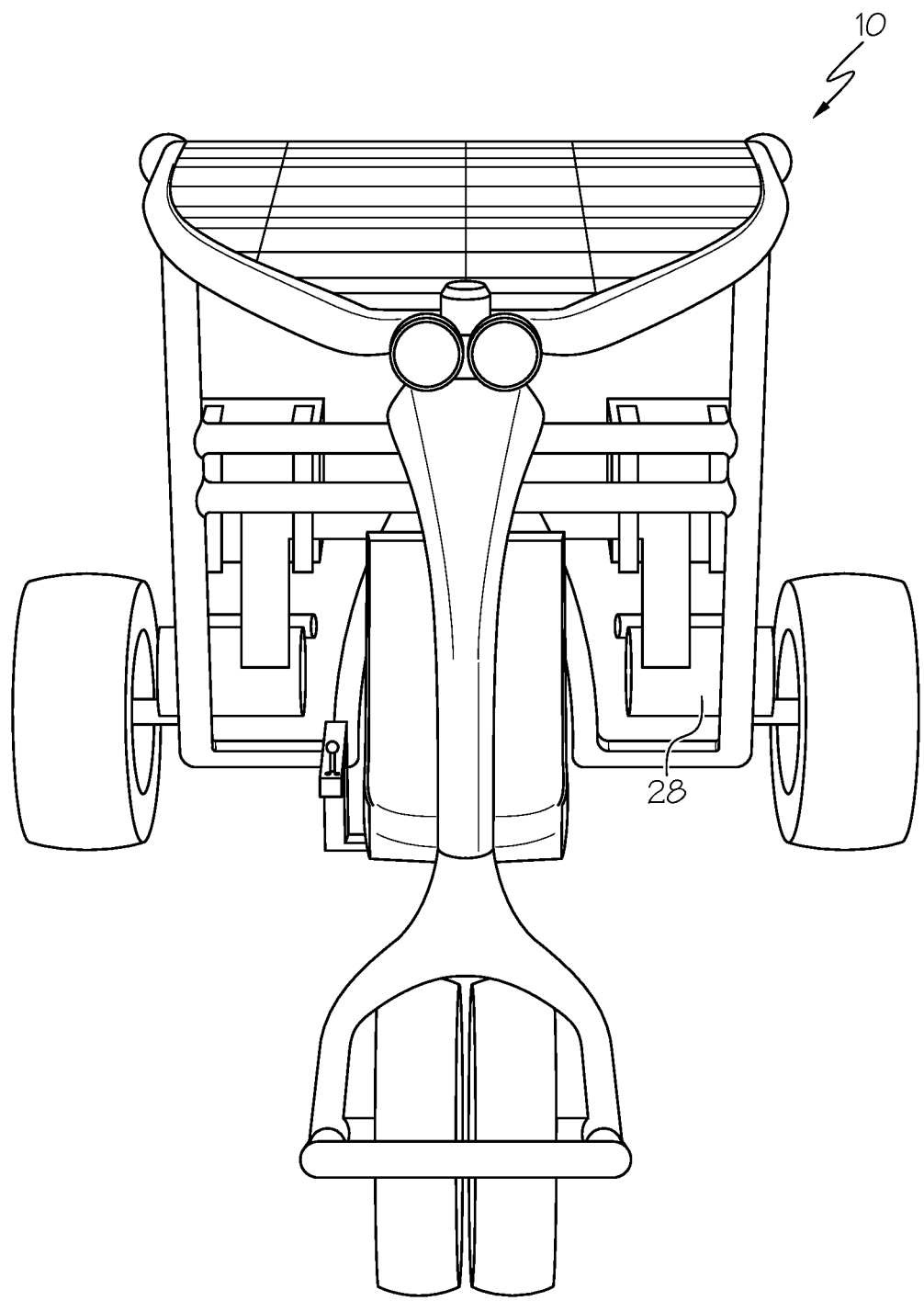
FIG. 3 is a front view.
Figure 4:
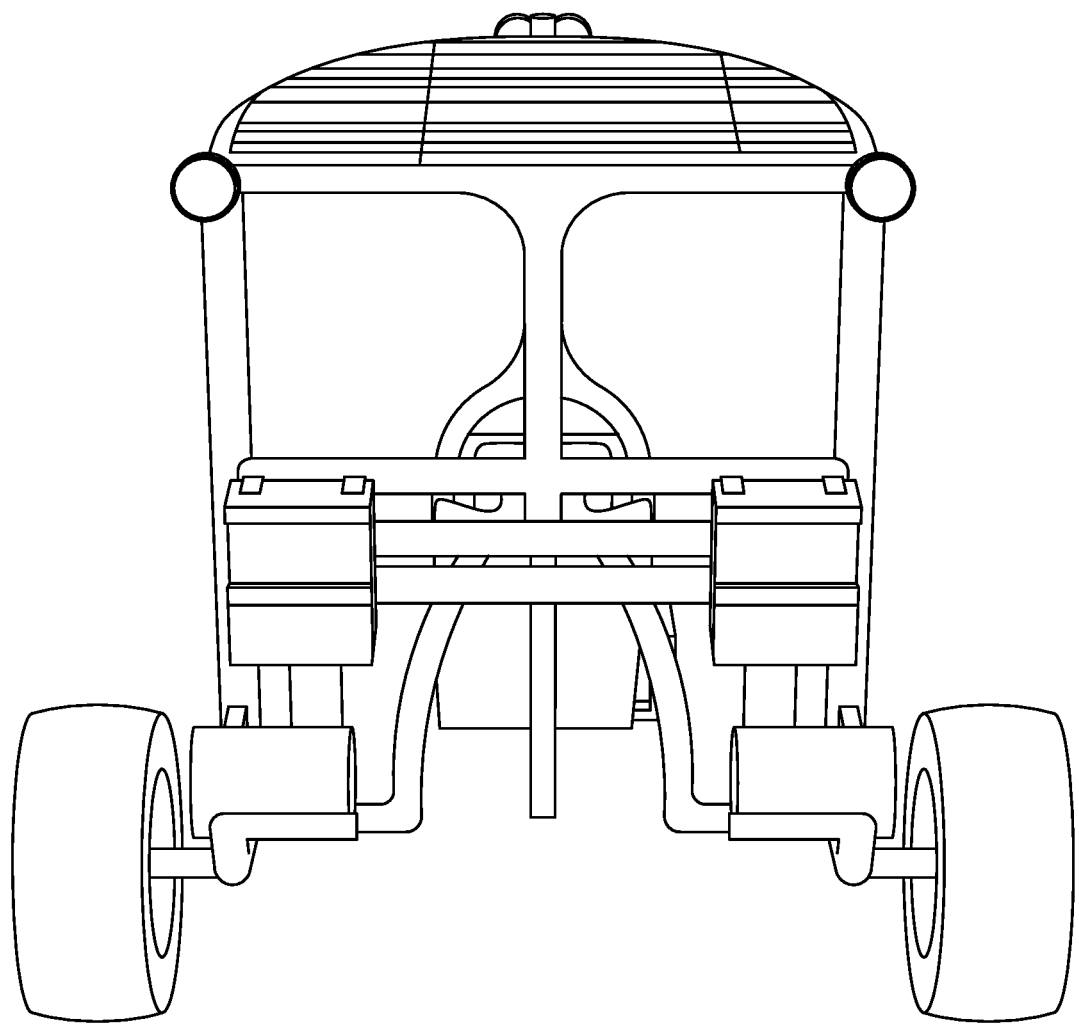
FIG. 4 is a rear view.

For the purposes of this disclosure, like reference numerals in the figures shall refer to like features unless otherwise indicated.

This vehicle is unique. I have entitled it Electric Vehicle with Movable Operator's Chair for reasons herein described. It is a three wheeled vehicle with the single wheel forward. The dual single wheel is a caster wheel and is not powered. The entire frame for the vehicle is behind the operator, over the top and a single caster wheel support arm is forward from the operator. The caster wheel support arm is power movable from left to right. The reason for that is that the operator can direct the front dual wheel caster to track with either of the rear drive wheels when planting, maintaining or harvesting or for special maneuverability in tight corners or moving around obstacles. The rear drive wheels can be each extended outwards 12" to enable the vehicle to track with different row crop spacing's for any type of crop be it vegetable, fruit, grain, flowers or woody plants. With the advantage of computerized control the vehicle can make a U turn at the end of the row with the castor wheel tracking a rear wheel thus making only a two wheel track in the crop when turning rather than three, or four tracks. No other vehicle has this capability that the inventor has ever heard of. The vehicle's separate electric drive wheel motors are battery powered and the roll over protection roof embodies a solar panel to charge the batteries during use. The roof also provides sun and rain protection for the operator and an adequate cooling or heating fan may be installed there also which keeps the mosquitos away as well. The control of the drive motors is by a single joystick which is easily moved from the right arm rest position to the left arm rest position. The vehicle can of course turn in its own diameter. When the seat is in the ground position or near ground position the foot rest automatically extends forward for maximum operator comfort. There are two rollers at the front of the foot rest that prevents the foot rest from engaging in the earth. Brackets for supporting trays, bins or bags are part of the vehicle. A rear dump box can be attached to the vehicle which would have caster wheels to further prevent a rear tip event. A coded number would be required to operate the vehicle and a seat belt with infrared thermal detectors would be used to be sure the belt is secured around a real person's waist. The seat requires 100 pounds of pressure to operate the vehicle which further eliminates small children from operating the vehicle. The maximum speed of the vehicle would be about 10 miles per hour. The vehicle can be programmed by entering a number code so it would not exceed a speed of 2 miles per hour for safety reasons when used by certain designated persons. A second seat can be added by simply snapping it in place and it would have its own controls as well. The vehicle is approximately 46" wide by 94" long by 62" high with the rear wheels retracted. For further safety a flashing warning light would appear as well as an audible buzzer that alerts the operator of a danger of side tipping when the vehicle gets within 10 degrees of tipping.

Operation and Use. The vehicle's use for vegetable farming is inherent. It is simple to operate because it has one joy stick, not two. Simply move the joystick forward to go forward and backwards to go backwards. Ditto for left and right. Putting the joystick in the far right position, for instance, causes the left drive wheel to go forward and the right drive wheel to go backwards which causes the vehicle to turn in its own diameter. Other push button controls move the seat to up, down, left and right and moves the rear wheels in or out and moves the caster wheel control arm to the right or left. The joystick control can be locked by simply pushing down on it except for speeds over 2 miles per hour. The forward direction control can be by GPS to maintain straight rows. Other controls are for the lights and turn signals. It can be remote controlled for driving it onto a ramp for loading and unloading which is also another safety feature. It can be used for debris pickup, city and park maintenance, weed control, golf course maintenance, trail maintenance, storm cleanup, organic farming, farmers helper, boulevard and road ditch cleanup, fence repair and debris cleanup, senior citizen garden projects, playground maintenance, beach cleanup, flower garden planting and maintenance, cemetery maintenance and marker cleaning and resetting markers back to vertical position, help with general construction tasks including management and inspection, cleaning large buildings, make for more efficient operations for large distribution centers and manufacturing operations for delivery, errands and observation, landscape construction, removing diseased Turkeys from large herds and inspection and cleaning of large dairy operations, observing assembly lines and repair of robots, rolling inspection of railroad tracks and many, many more. It has on board electrical power for power tools of any DC voltage desired for power tools, vacuums, pressure washing, weed whips, cultivators etc. Besides all of that it could be an excellent deluxe scooter for the handicapped and the able. Again, safety is in mind when the operator has the ability to extend the rear wheel base by 24" for better stability on side grades such as when removing debris from road sides.

Referring to FIGS. 1-4, the vehicle is shown generally at 10. The frame has a rear section 12 and a top section 14 which is configures to support a solar panel 16, which charge a pair of batteries 18 and 20, which power the vehicle. The frame can be made from any material, whether metal, plastic or even carbon fiber, and can be hollow for running electrical wires to the various components. Rear wheels 22 and 24 are connected to the frame and are driven by electric motors 26 and 28. The rear wheels are connected such that they can be moved outwardly up to 12 inches each, to adjust the rear wheels for different crop row widths and to provide additional stability if operating the vehicle on a slanted surface. A front dual caster wheel 30 is rotatably connected to a caster wheel arm 32 at 34 and the wheel arm 32 is rotatably connected to the upper frame 14 at 36. The operator chair 38 is connected to a chair arm 40 which is connected to a motorized chair movement device which can move the chair upwards and downwardly on rear frame section 42, and horizontally on rear frame section 44.

Figure 5:
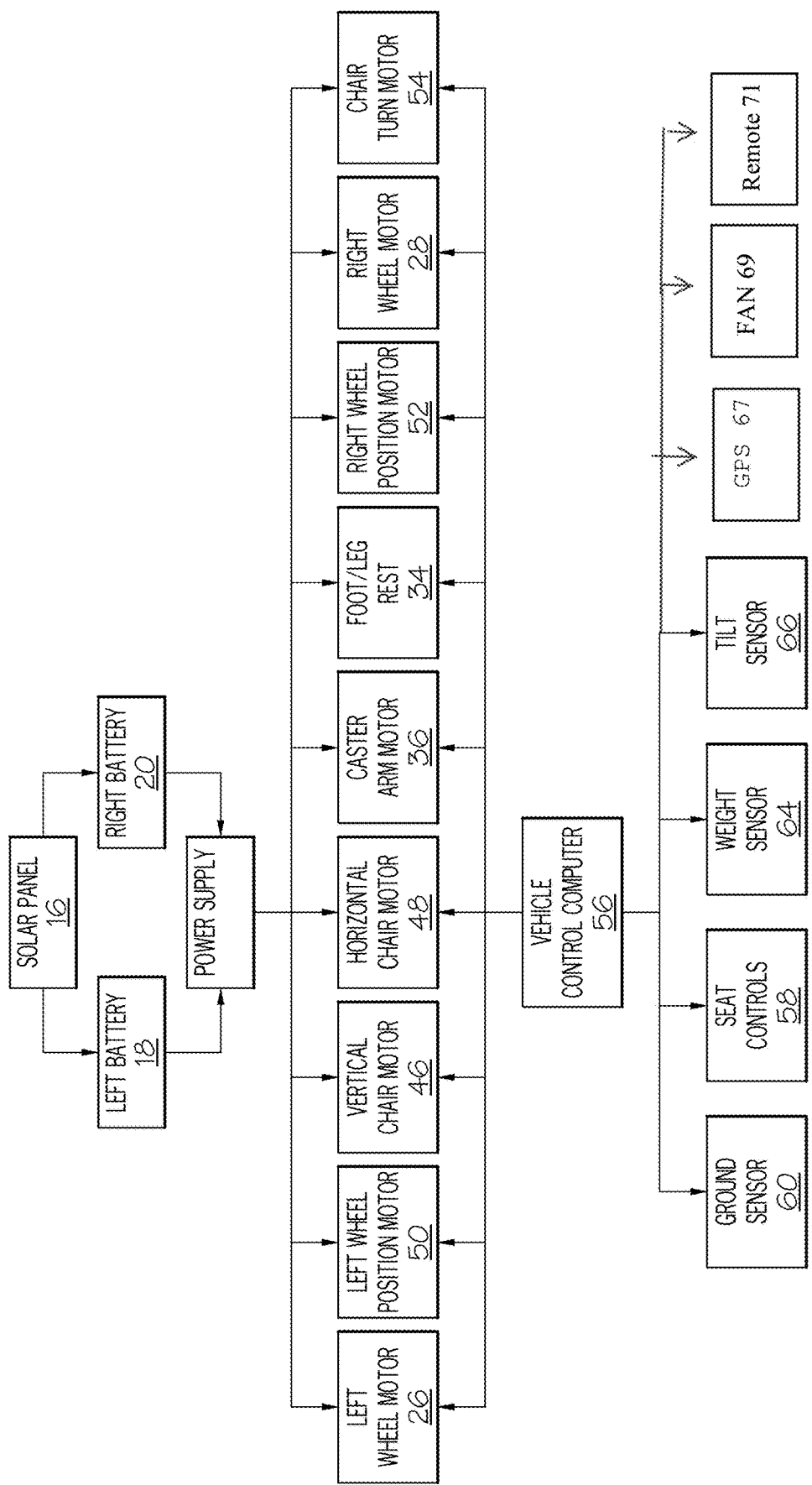
FIG. 5 is a block diagram of the invention.

Referring now to FIG. 5, a block diagram of the invention is shown in which the motorized chair movement device has a vertical motor 46 for moving the chair upwardly and downwardly, and a horizontal motor 48 for moving the chair to the right and left. The drive motor compartments 26 and 28 can also contain wheel position motors 50 and 52, which can move the wheels outwardly (and inwardly) up to 12 inches each, as is well known in the art. Caster arm 40 can be turned by the caster arm motor 36 which automatically positions the front caster wheel. The chair can be turned 90 degrees to the right or left using chair turn motor 54. The control computer is mounted to the ceiling of the operators compartment forward of center and is shown at 56 and is operatively connected to all the vehicle components, including the seat controls 58 (including the joystick control, the buttons for moving the chair up and down, left and right, buttons for moving the wheels wider or narrower, buttons for turning the chair left or right and controls for operating the headlights and turn signals) and the footrest 62. The vehicle footrest 62 has a ground sensor (such as a roller or pair of rollers) 60 which is used to prevent the footrest 62 from engaging the ground. A weight sensor 64 is connected under the seat and connected to the control computer 56 to prevent the vehicle from being operated unless a predetermined weight is present on the chair 38 (such as 100 pounds, or any other desired weight). A tilt sensor 66 is attached to the vehicle 10 to provide a flashing light indicator and/or an audible buzzer if the vehicle is within 10 degrees of tipping over. A GPS guidance system 67 is connected to the control computer so the vehicle can travel in a straight and precision direction when moving forward, and where the joystick can be locked in the front position, so the vehicle can move in a straight direction when moving forward. A fan 69 is also connected to the control computer to provide heating or cooling. A remote control 71 is operatively connected to the control computer to allow for controlling the vehicle without an operator.

Figure 6:
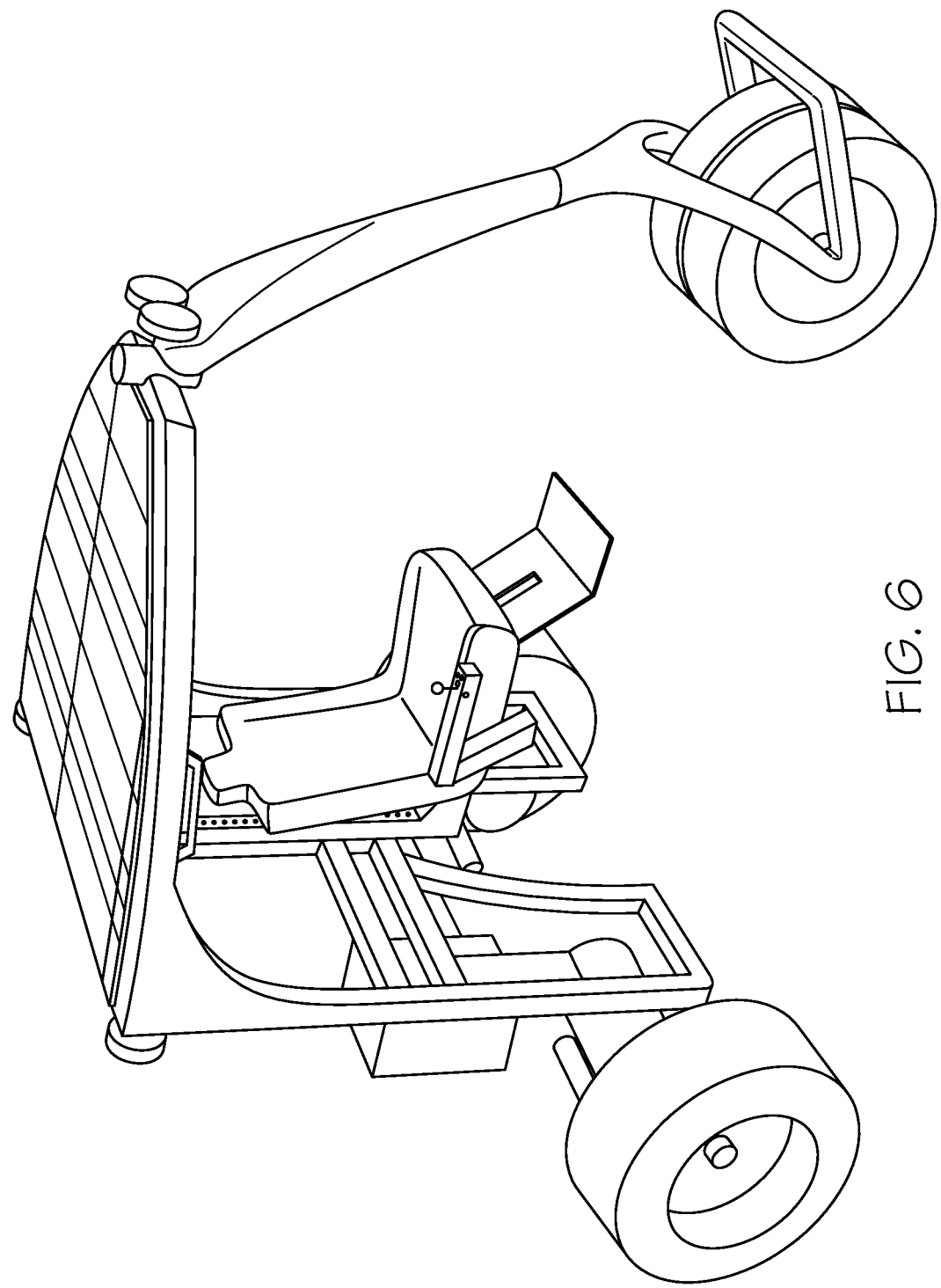
FIG. 6 shows the chair in the upper position.
Figure 7:
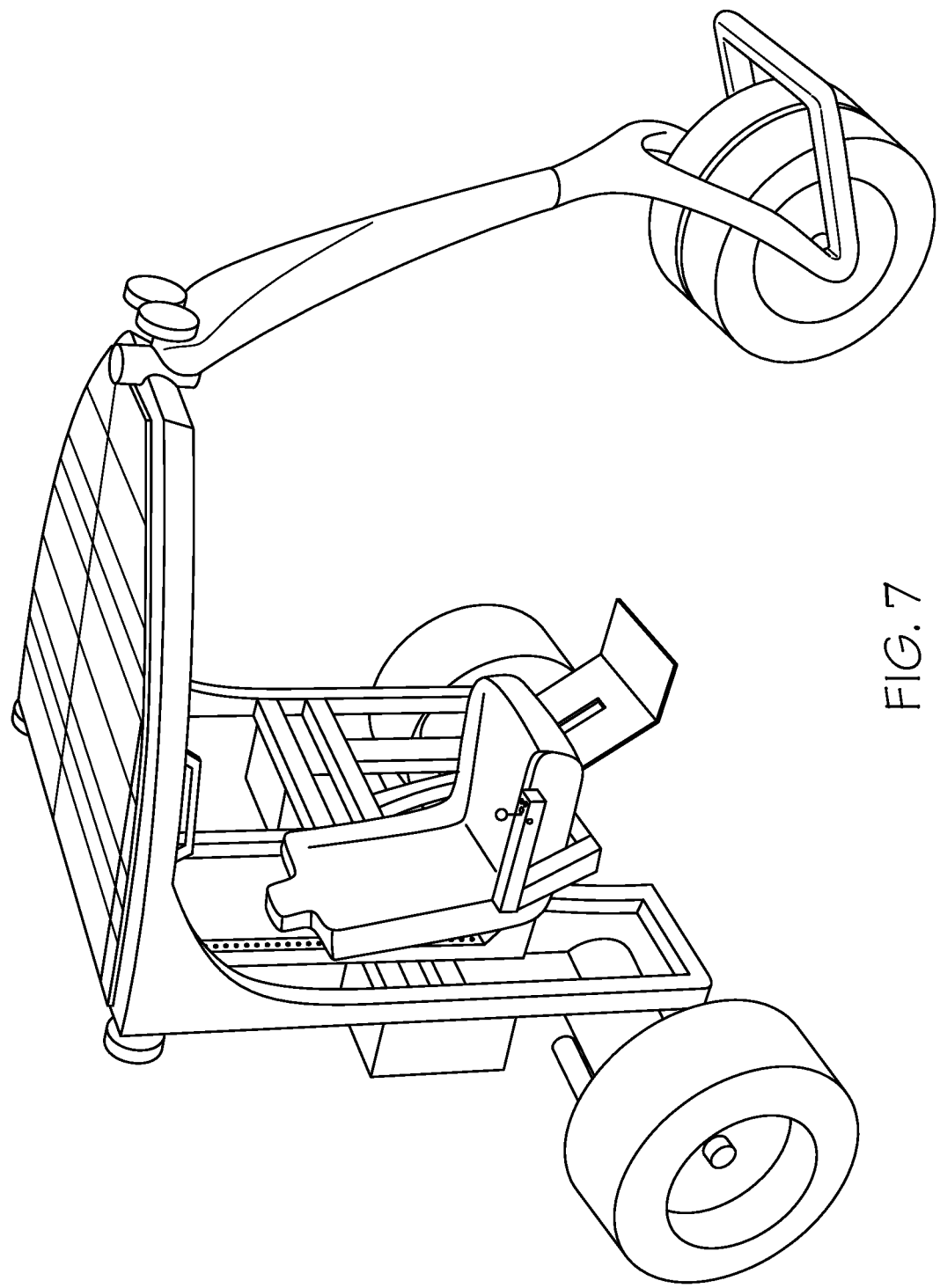
FIG. 7 shows the chair moved to the left side (looking back at the vehicle from the front end).
Figure 8:
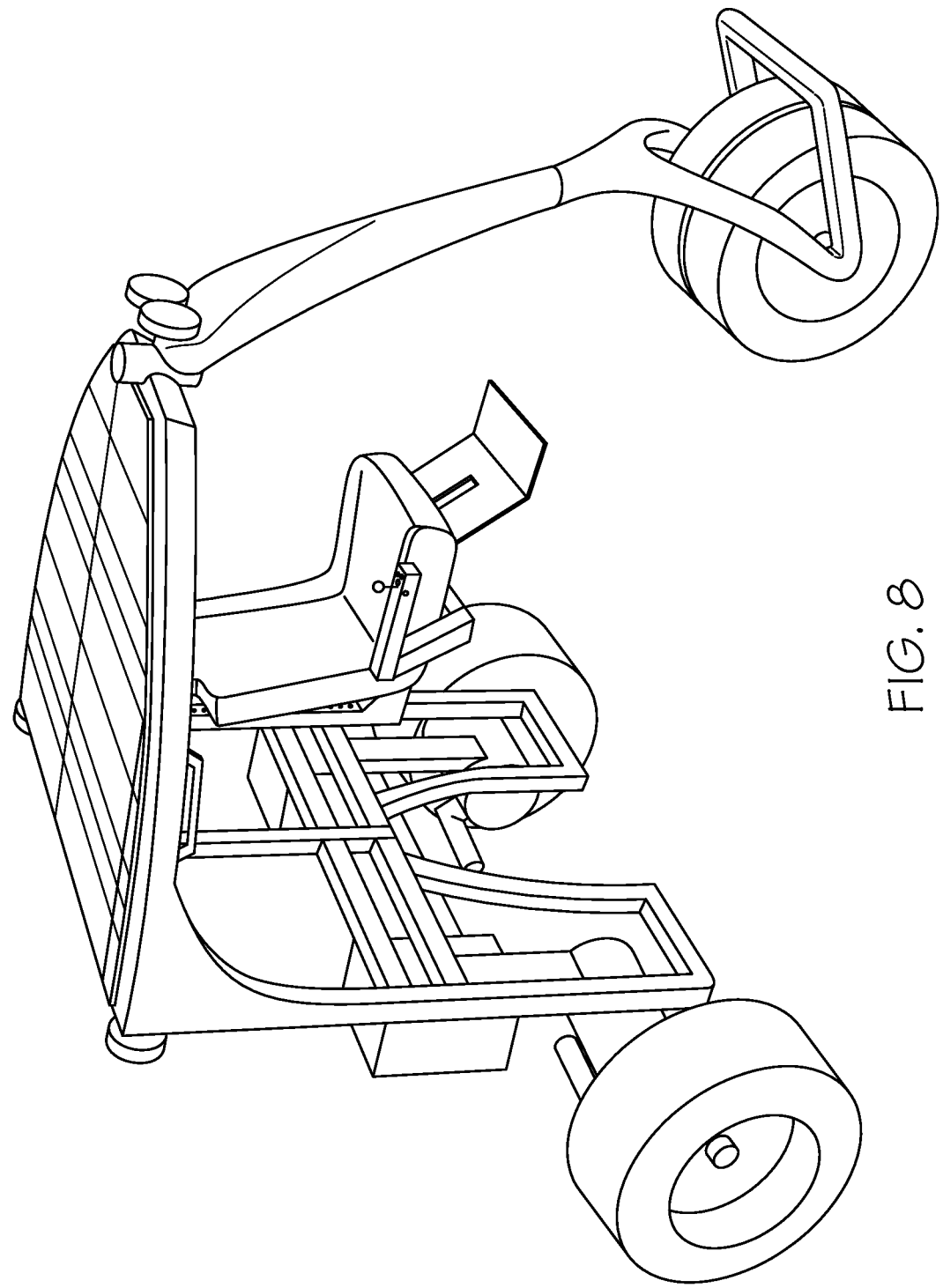
FIG. 8 shows the chair moved to the upper right side.
Figure 9:
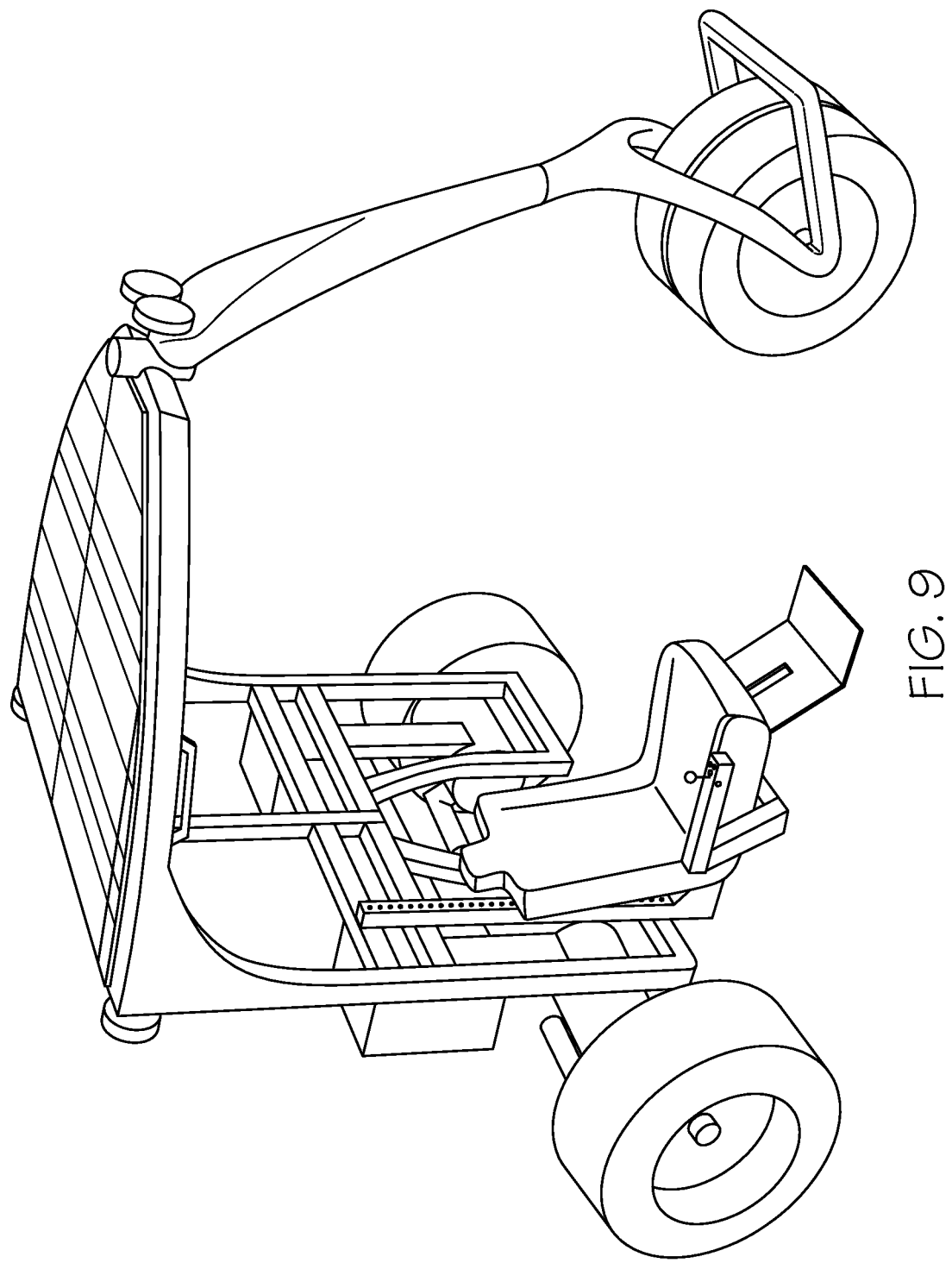
FIG. 9 shows the chair moved to the lower left side.
Figure 10:
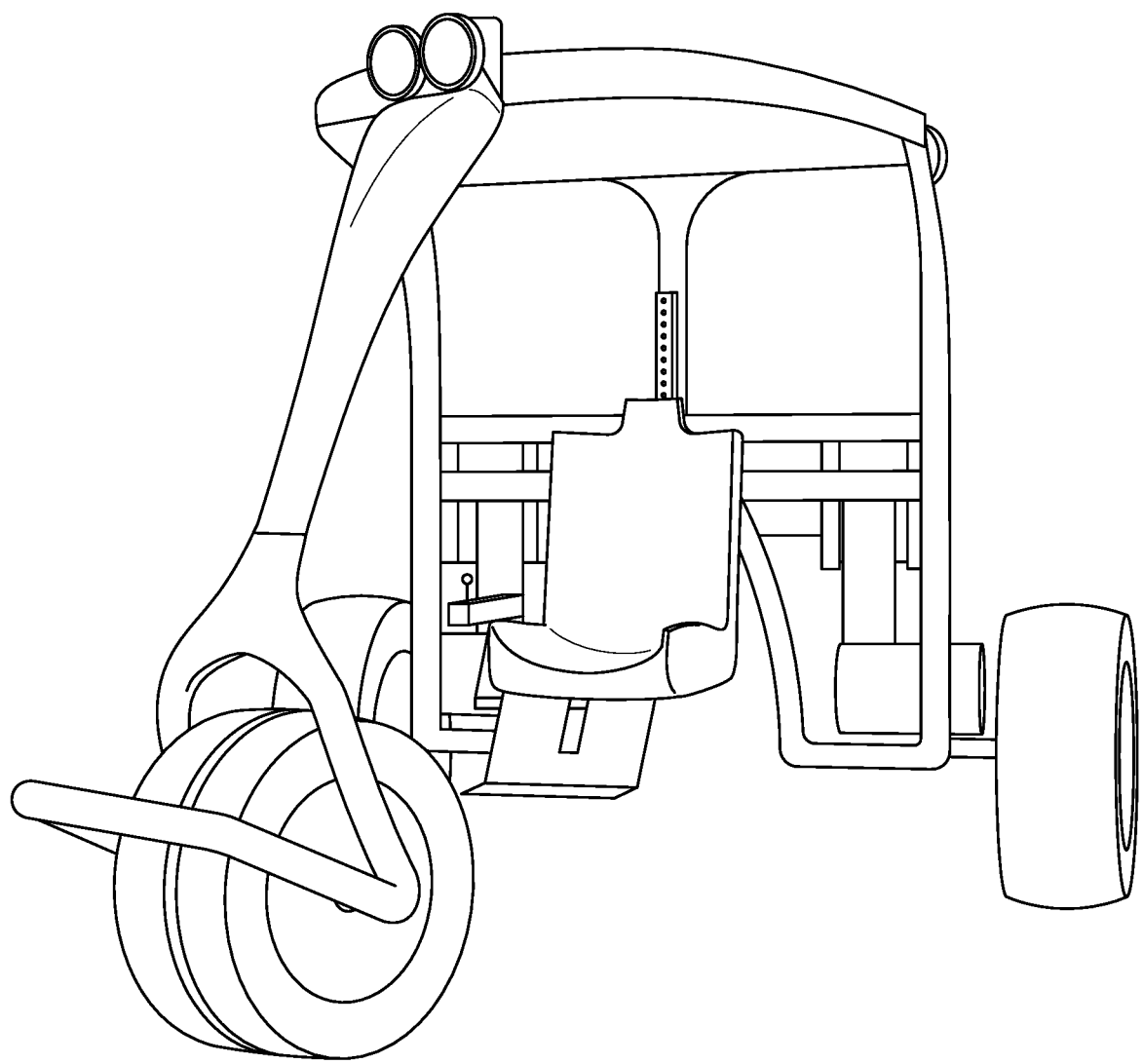
FIG. 10 shows the caster arm moved to the left (looking back at the vehicle from the front end).
Figure 11:
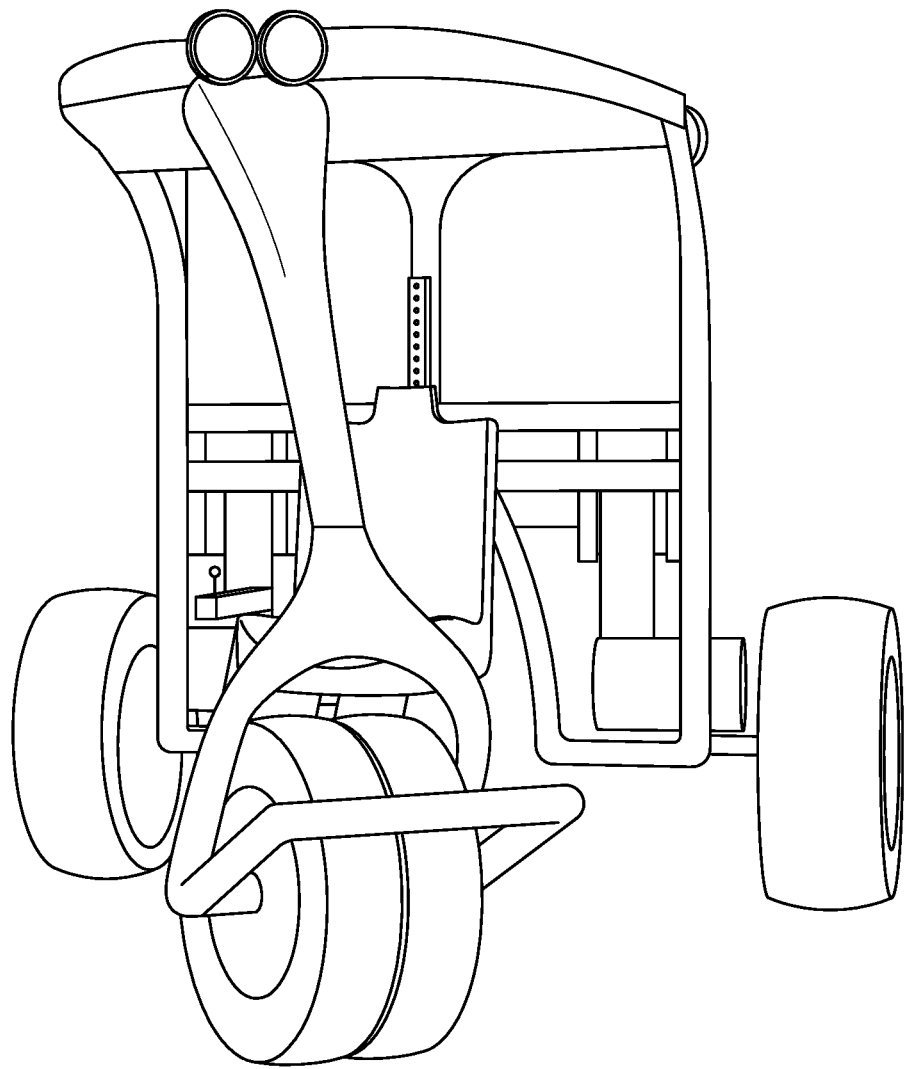
FIG. 11 shows the caster arm moved to the right.
Figure 12:
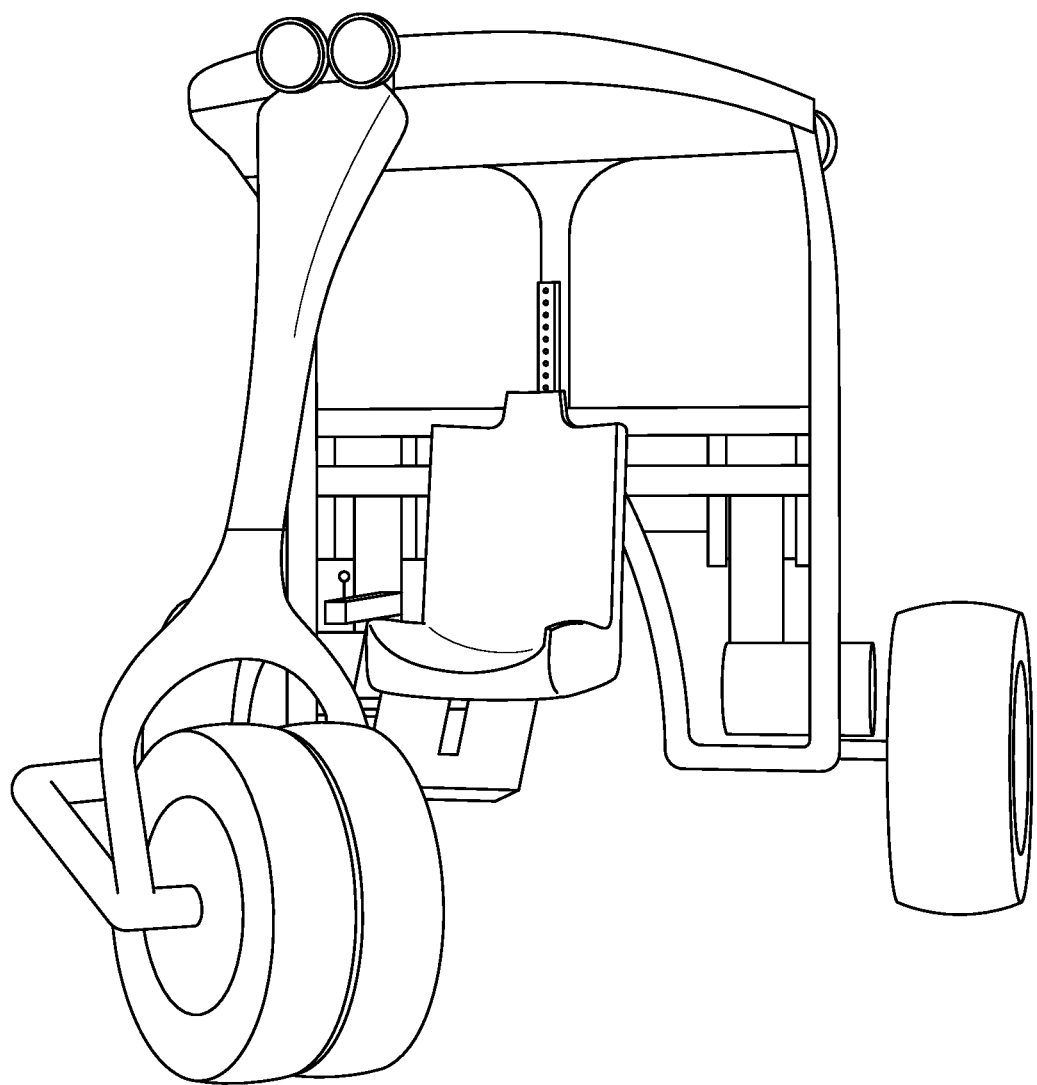
FIG. 12 shows the caster wheel rotating relative to the caster arm.
Figure 13:
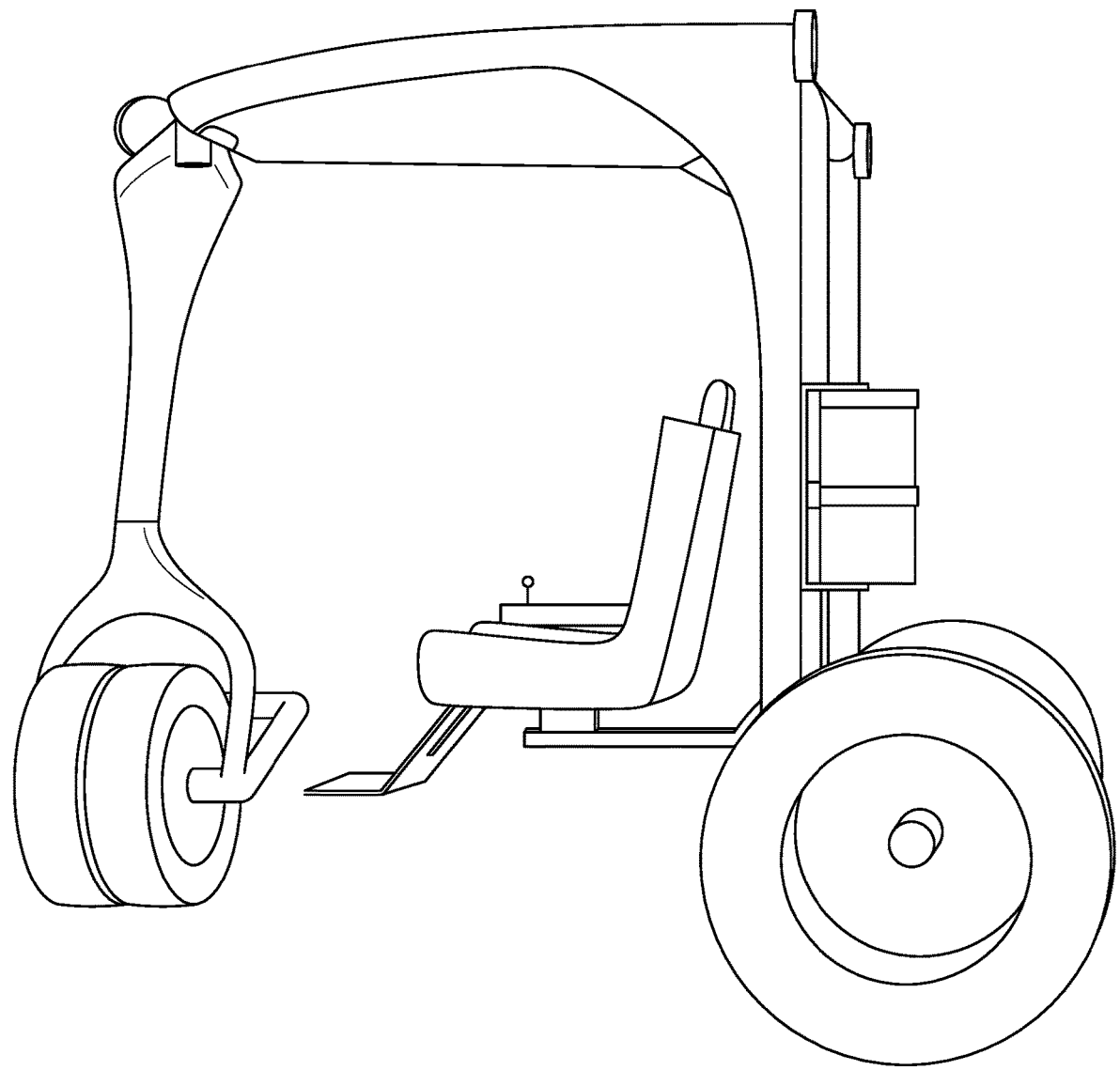
FIG. 13 shows the vehicle positioned to turn about its own diameter.
Figure 14:
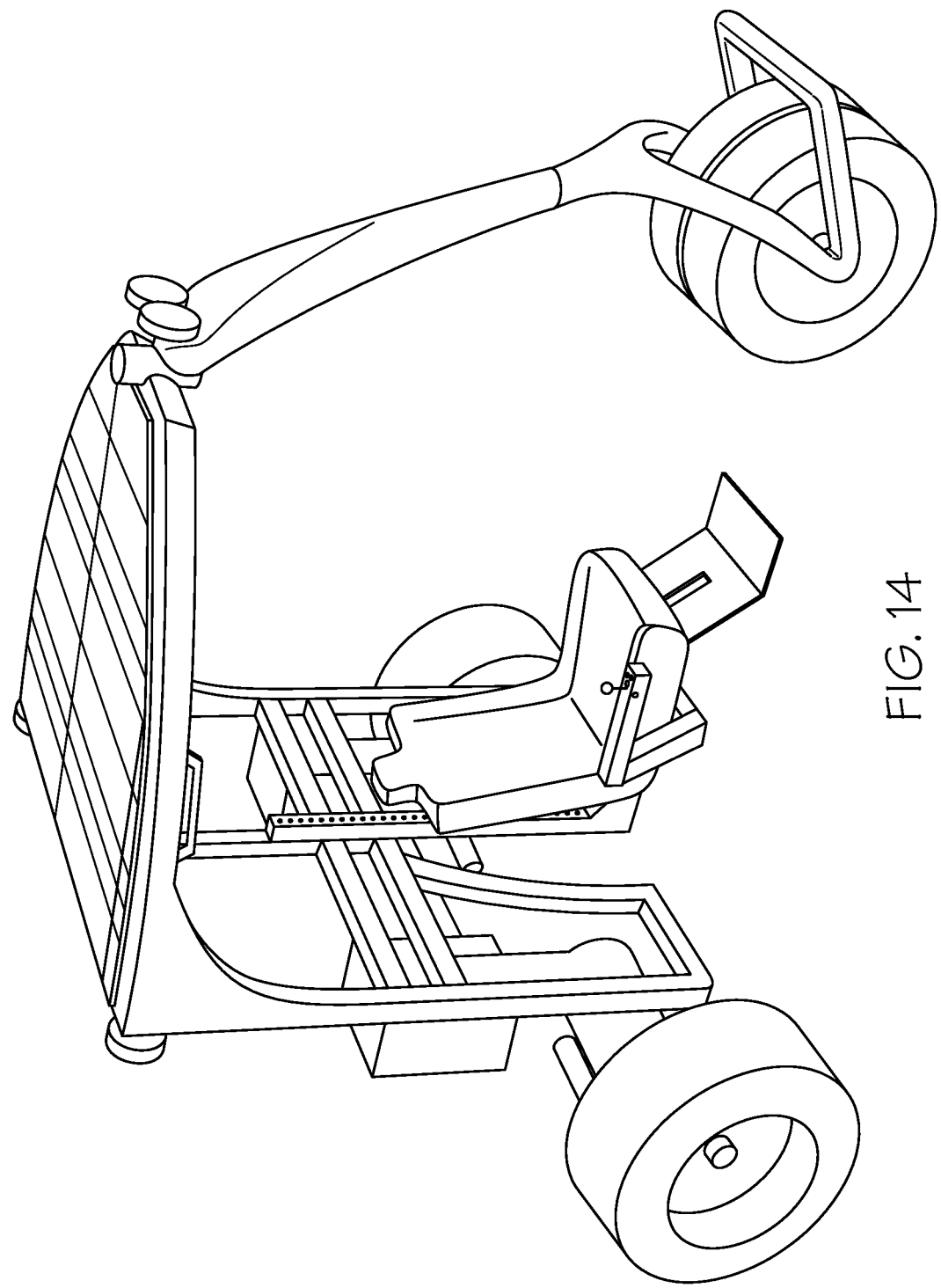
FIG. 14 shows the vehicle with the wheels in their extended position.

FIG. 6 shows the chair in the upper position. FIG. 7 shows the chair moved to the left side (looking back at the vehicle from the front end). FIG. 8 shows the chair moved to the upper right side. FIG. 9 shows the chair moved to the lower left side. FIG. 10 shows the caster arm moved to the left (looking back at the vehicle from the front end). FIG. 11 shows the caster arm moved to the right. FIG. 12 shows the caster wheel rotating relative to the caster arm. FIG. 13 shows the vehicle positioned to turn about its own diameter.

When the seat is being lowered to its lowest position the foot rest extends forward such that it becomes a leg support platform extended horizontally much like the foot rest on a recliner sofa/chair. There is a shock absorbing connection at the swivel connection for the 360 degree caster wheel joint to absorb impact should the caster wheel hit an obstruction. The overhead frame provides roll-over protection in addition to providing power and acting as a roof. Electrical outlets will be included for 12, 18, 24 and 36 volt DC and an inverter that provides 110 volt electricity for powering standard electrical tools as well as outlets for USB charging. Vehicle charging ports can be 120 volt or quick charge 240 volt AC. The vehicle controls (computer driven) may also include a speedometer, odometer, an hour meter and a battery charge percentage gauge.

Figure 15:
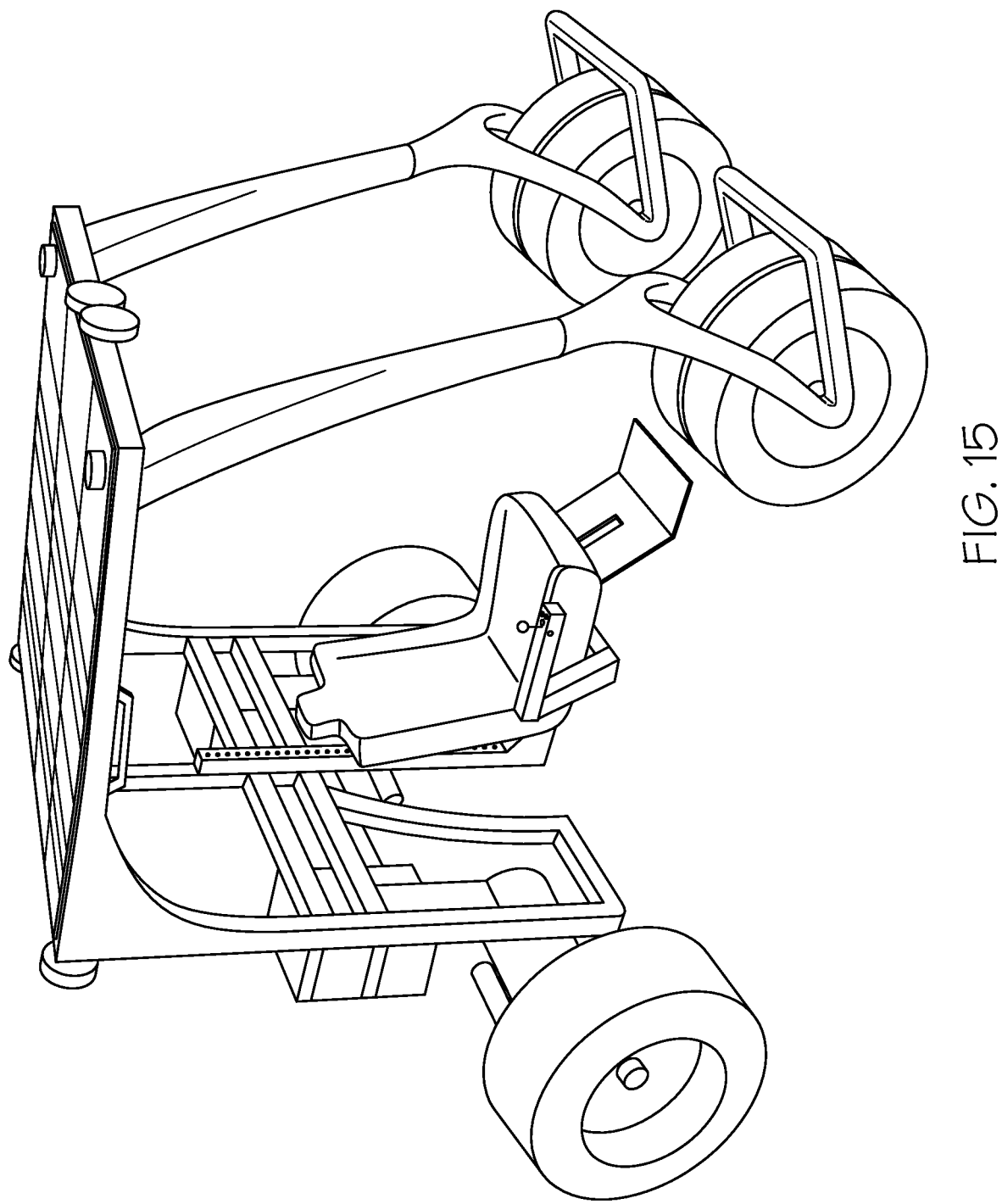
FIG. 15 shows the vehicle four wheel embodiment of the invention.

Alternative embodiments. A four wheel version of this vehicle could be manufactured (see FIG. 15), not as an improvement but to guard against others trying to apply for such a design change patent. Also, a three wheel version with the caster wheel placed in back of the vehicle could be manufactured which allows the operator full forward access. Safety measures would be taken to protect the operator. Also, a smaller version which could travel through a three foot wide door opening could be manufactured as well as a larger version for much larger persons.

While this invention may be embodied in many forms, there are described in detail herein specific embodiments of the invention. This description is an exemplification of the principles of the invention and is not intended to limit the invention to the particular embodiments illustrated.

What is claimed is:

1. A vehicle comprising:
   a frame defining an operator compartment, the operator compartment having a back section and having open sides and an open bottom;
   a first movable chair attached to a motorized chair movement device which allows the chair to be moved vertically and horizontally on the back section of the operator compartment within the operator compartment;
   a pair of rear wheels connected to the frame, each being driven by an electric motor;
   the frame having an upper section defining the top of the operator compartment and being constructed and arranged to support a solar panel;

the solar panel being electrically connected to at least one battery which is connected to the frame and which provides power to the vehicle;

a pair of front caster wheels each rotatably connected to a caster wheel arm which is rotatably connected to the upper frame section;

a control computer connected to the rear wheel motors, motorized chair movement device, caster wheel arm and foot/leg rest;

a plurality of operator controls connected to the first movable chair and operably connected to the control computer for operating the vehicle.

2. The vehicle of claim 1 wherein the plurality of operator controls includes a joystick control for driving the vehicle forward when the joystick is moved forward, rearward when the joystick is moved rearward, turns the vehicle to the right when the joystick is moved right and turns the vehicle to the left when the joystick is moved left.

3. The vehicle of claim 2 wherein the joystick control can be moved to either the far or extreme right or left to U turn positions to trigger either a right U-turn or a left U-turn in which the control computer causes the front castor wheels to track a rear wheel thus making only a two wheel track rather than four tracks.

4. The vehicle of claim 3 wherein the control computer can turn the vehicle in its own diameter.

5. The vehicle of claim 2 further including a GPS guidance system connected to the control computer so the vehicle can travel in a straight and precision direction when moving forward, and where the joystick can be locked in the front position, so the vehicle can move in a straight direction when moving forward.

6. The vehicle of claim 1 wherein the plurality of operator controls includes a button which moves the chair vertically, upwardly or downwardly.

7. The vehicle of claim 1 wherein the plurality of operator controls includes a button which moves the chair horizontally, rightwardly or leftwardly.

8. The vehicle of claim 1 further including a ground sensor connected to the bottom of a footrest connected to the chair, the ground sensor being operatively connected to the control computer to prevent the footrest from engaging the ground.

9. The vehicle of claim 1 wherein the rear wheels are movably connected to the frame such that the rear wheels can be selectively moved from a first position, outwardly up to 12 inches each, and can be selectively moved inwardly back to the first position.

10. The vehicle of claim 1 further including a tilt sensor connected to the vehicle and to the control computer so to trigger a flashing light and/or an audible buzzer when the vehicle gets within 10 degrees of tipping.

11. The vehicle of claim 1 further including a weight sensor connected to the chair and operatively to the control computer to prevent the vehicle from being operated unless a predetermined weight is on the chair.

12. The vehicle of claim 1 further including a cooling or heating fan mounted to the top of the operator compartment.

13. The vehicle of claim 1 further including a remote control for controlling the vehicle without an operator, as a safety feature for moving the vehicle onto a ramp for loading and unloading.

14. The vehicle of claim 1 further including headlights and turn signals and wherein the plurality of operator controls include controls for operating the headlights and turn signals.

* * * * *